(12) United States Patent
Hagiwara

(10) Patent No.: US 6,328,444 B2
(45) Date of Patent: Dec. 11, 2001

(54) EYEGLASS FRAME FORMED WITHOUT BROACHES OR BRAZING

(75) Inventor: Tsutomu Hagiwara, Fukui (JP)

(73) Assignee: Beat Corporation (JP)

( * ) Notice: Subject to any disclaimer, the term of this patent is extended or adjusted under 35 U.S.C. 154(b) by 0 days.

(21) Appl. No.: 09/776,667

(22) Filed: Feb. 6, 2001

(30) Foreign Application Priority Data

Apr. 10, 2000 (JP) .................................................. 12-108153
Apr. 10, 2000 (JP) .................................................. 12-108272

(51) Int. Cl.[7] .................................................. G02C 1/08
(52) U.S. Cl. .................................. 351/92; 351/90; 351/95
(58) Field of Search .................................. 381/90, 91, 92, 381/93, 94, 95, 96, 97, 98, 99, 100, 101, 102

(56) References Cited

U.S. PATENT DOCUMENTS 4,601,555 * 7/1986 Tabacchi et al. ..................... 351/90
6,015,212 * 1/2000 Fortini ................................. 351/92

* cited by examiner

Primary Examiner—Hung Xuan Dang
(74) Attorney, Agent, or Firm—Bacon & Thomas PLLC

(57) ABSTRACT

A front part includes an upper frame and a lower frame, which are formed by bending a wire material, in which the upper frame and the lower frame each have rim pieces formed at both ends of a connecting part, which are retained to each other at the center, and in which wraparound end pieces provided on the outside of the upper and lower rim pieces are connected to each other to be assembled. The upper and lower frames have the wraparound end pieces in which rings are formed on the outside thereof, and temple has also rings formed at ends thereof. The rings are assembled, a shaft is fitted in shaft holes of the rings and is tightened with a screw.

9 Claims, 9 Drawing Sheets

EYEGLASS FRAME FORMED WITHOUT BROACHES OR BRAZING

BACKGROUND OF THE INVENTION

1. Field of the Invention

The present invention relates to spectacles, more specifically, to spectacles having a new front-part structure in which lenses can easily be fitted, broaches as in conventional spectacles are not required, and legs to which nose pads are attached are not provided by brazing, and a new temple joint structure in which the temples can be attached stably without loosening.

2. Description of the Related Art

Conventionally, spectacles comprise a front part and temples. The front part has lenses fitted in rims thereof, and the temples are foldably attached to both outsides of the front part.

The front part of the spectacles has the rim for fitting the lenses. A metallic spectacles frame has broaches for extending the periphery length of the rim when fitting or taking off the spectacles. As shown in FIG. 10, the broach has such a structure that a broach 52 is brazed to the outside of a rim 51, which is cut together with the rim 51 so as to form broach pieces 53 and 54, and both of which can be tightened to each other with a screw.

The front part of the spectacles is not only the above-described form having the rim, but a form called rimless spectacles having no rim in which the lenses are directly attached with screws, and a form called a nylon frame having a half rim at the upper half of the lenses and in which the lower half is held with a high-tension filament such as a metal filament.

On the other hand, the rim of the front part has lenses fitted therein. In addition, nose pads are attached to the front part, for putting and supporting the front part on the nose when putting on the spectacles. The nose pads are each attached to an end of a leg brazed to the front part. That is, the nose pads are fitted in an attaching part called a box leg brazed to the end of the leg. Therefore, in such a structure for attaching the nose pads, it takes a long time to manufacture and attach, and also problems occur in that the brazed part comes off and the nose pad is removed. The front part structure of the conventional spectacles has the problems as described above.

In the conventional spectacles, a hinge is generally used as a temple joint structure. The hinge has two hinge pieces that can be bent around a shaft screw as the center, and the hinge pieces are brazed to the front part and the temple, respectively.

In a spectacle frame to which the temple is attached using the hinge, a forged temple and a forged wraparound endpiece are used in order to have a planar surface to which the hinge pieces of the hinge can easily be brazed. That is, if there is not an enough brazing area, the parts will come off. Therefore, the temple of the spectacles frame formed of a thin wire material cannot ensure sufficient brazing area, so that it is not suitable for using the hinge as a joint.

On the other hand, in a slim spectacle frame formed of the thin wire material, the conventional temple joint structure using the hinge spoils the appearance of the frame and is not applicable in view of design. Although manufacturing a small hinge that does not spoil the appearance can of course solve the problem, it is difficult to manufacture such a small hinge. It is also difficult to support the long temple with the small hinge, and the hinge may become loose so that the position of the spectacles may slip when putting on the spectacles. As described above, the conventional spectacles have the problems in the temple joint structure.

SUMMARY OF THE INVENTION

Accordingly, it is an object of the present invention to provide spectacles using a new front structure that is different from the conventional front structure, in which lenses can easily be fitted, in which there is no need for the broach as in the conventional spectacles, and in which legs to which nose pads are to be attached are not provided by brazing, and a new temple joint structure in which the temple can be stably attached without loosening.

In order to solve the above problems, spectacles according to the present invention comprise a front part for holding lenses, and temples foldably attached to both outsides of the front part. The front part structure includes an upper frame having upper rim pieces on both ends of a connecting part, and a lower frame having lower rim pieces on both ends of the connecting part, in which the upper and lower frames are retained to each other at the center, in which wraparound end pieces provided on the outside of the upper and lower rim pieces are connected to each other so as to assemble the upper and lower frames, and in which legs to which nose pads are to be attached are continuously formed between the rim pieces and the connecting part of the upper frame or the lower frame. In the temple joint structure, rings formed by bending the upper and lower frames on the outside of the front part are provided at the upper wraparound endpiece and the lower wraparound endpiece, and also rings formed by bending ends of the temples are provided, in which the rings are assembled, a shaft is fitted in shaft holes without loosening, and which is tightened with a screw.

Other spectacles according to the present invention comprise a front part for holding lenses, and temples foldably attached to both outsides of the front part wherein the front part structure includes an upper frame having upper rim pieces on both sides of a connecting part, and lower rim pieces attached to the upper rim pieces, forming a pair, in which inner ends of the lower rim pieces are respectively retained to retaining parts formed between the upper rim pieces and the connecting part of the upper frame, in which wraparound end pieces provided on the outside of the upper and lower rim pieces are connected to each other so as to assemble the upper frame and the lower rims, and in which legs to which nose pads are to be attached are continuously formed between the upper rim pieces and the connecting part of the upper frame; and the temple joint structure has rings at the upper wraparound endpiece and the lower wraparound endpiece, the rings being formed by bending the upper frame and the lower rim pieces on the outside of the front part, and which has also rings formed by bending ends of the temples, in which the rings are assembled, a shaft is fitted in shaft holes without loosening, and which is tightened with a screw.

Furthermore, other spectacles according to the present invention comprise a front part for holding lenses, and temples foldably attached to both outsides of the front part, wherein the front part structure includes an upper frame having upper rim pieces on both sides of a connecting part and lower rim pieces attached to the upper rim pieces, forming a pair, in which inner ends of the lower rim pieces are respectively retained to retaining parts formed between the upper rim pieces and the connecting part of the upper frame, in which wraparound end pieces provided on the outside of the upper and lower rim pieces are connected to each other so as to assemble the upper frame and the lower rim pieces, and in which legs to which nose pads are to be attached are continuously formed between the upper rim pieces and the connecting part of the upper frame; and the temple joint structure has rings at the upper wraparound end pieces on the outside of the front part, the rings being formed by bending the upper frame, and which has also rings formed by bending ends of the temples, in which the rings are assembled, a shaft is fitted in shaft holes without loosening, and which is tightened with a screw.

Furthermore, other spectacles according to the present invention comprise a front part for holding lenses, and temples foldably attached to both outsides of the front part, wherein the front part structure includes an upper frame having upper rim pieces on both sides of a connecting part and lower rim pieces attached to the upper rim pieces, forming a pair, in which inner ends of the lower rim pieces are respectively retained to retaining parts formed between the upper rim pieces and the connecting part of the upper frame, in which outer ends of the lower rim pieces are retained to retaining parts formed between the upper rim pieces and the wraparound end pieces of the upper frame so as to assemble the upper frame and the lower rim pieces, and in which legs to which nose pads are to be attached are continuously formed between the upper rim pieces and the connecting part of the upper frame; and the temple joint structure has rings at the upper wraparound end pieces and the lower wraparound endpieces on the outside of the front part, the rings being formed by bending the upper frame and the lower rim pieces, and which also has rings formed by bending ends of the temples, in which the rings are assembled, a shaft is fitted in shaft holes without loosening, and which is tightened with a screw.

Furthermore, other spectacles according to the present invention comprise a front part for holding lenses, and temples foldably attached to both outsides of the front part, wherein the front part structure includes an upper frame having upper rim pieces on both sides of a connecting part, and lower rim pieces attached to the upper rim pieces, forming a pair, in which inner ends of the lower rim pieces are respectively retained to retaining parts formed between the upper rim pieces and the connecting part of the upper frame, in which outer ends of the lower rim pieces are retained to retaining parts formed between the upper rim pieces and wraparound endpieces of the upper frame so as to assemble the upper frame and the lower rim pieces, and in which legs to which nose pads are to be attached are continuously formed between the upper rim pieces and the connecting part of the upper frame; and the temple joint structure has rings at the upper wraparound endpieces on the outside of the front part, the rings being formed by bending the upper frame, and which also has rings formed by bending ends of the temples, in which the rings are assembled, a shaft is fitted in shaft holes without loosening, and which is tightened with a screw.

In the above-described spectacles, a form in which the lower rim piece has a hook connected to an inner end of a high-tension filament, and which has the lower wraparound endpiece connected to the outer end thereof, a form in which the lower rim piece has hooks connected to both ends of the high-tension filament, or the like is adopted.

Furthermore, in the above-described spectacles, in the temple joint structure, a form in which the shaft hole of the ring has a minus clearance in order to slightly increase the size thereof when the shaft is fitted, a form in which washers elastically deformed by tightening are fitted between the rings assembled, or the like is adopted.

In the above-described spectacles according to the present invention, if the front part is constructed by assembling the upper frame and the lower frame, the upper and lower frames are assembled so as to form the rim, in which the lens is fitted, and thereby the upper and lower frames are stabilized so as not to be disengaged from each other.

Here, the upper frame has the upper rim pieces formed at the both ends of the connecting part, the upper rim pieces being formed by bending a thin wire material, in which the upper wraparound endpieces for attaching the temples are provided on the outside thereof. On the other hand, the lower frame has the lower rim pieces formed at the both ends of the connecting part, the lower rim pieces being formed by bending a thin wire material in a manner similar to the upper frame, in which the lower wraparound endpieces for attaching the temples are provided on the outside thereof. In the upper frame or the lower frame, the legs for supporting the nose pads are formed by bending the same wire material, extending and curving downwardly between the inner ends of the rim pieces and the connecting part, into which the nose pads are fitted and attached.

In addition, the lower frame has the retaining parts formed between the lower rim pieces and the connecting part. By retaining the retaining parts between the upper rim pieces and the connecting part of the upper frame, the upper frame and the lower frame are assembled. In this way, the front part is constructed by assembling the upper frame and the lower frame. Accordingly, the rim is constructed by the upper rim piece and the lower rim piece, in which the lens is fitted, and thereby the frame is stabilized and the retaining part does not disengaged from the upper frame. The upper and lower wraparound endpieces on the outside of the upper and lower rim pieces are connected to each other to form a wraparound endpiece, to an end of which the temple is attached.

In the spectacles according to the present invention, the lower rim pieces may be respectively attached to the facing upper rim pieces without using the lower frame. The lower rim pieces are not limited to a metallic wire material, but a high-tension filament can be used.

The above-described spectacles according to the present invention use the temple joint structure in which the temples can be foldably attached without using hinges. The spectacles of the present invention construct the front part and the temples with the thin wire material. In the temple joint, the ring is formed at the wraparound endpiece as part of the front part, and also the ring is formed at the end of the temple, and the shaft penetrates the shaft holes of both of the rings.

Here, in the front part, the ring is formed by bending the end of wraparound endpiece, and the ring at the end of the temple is also formed by bending. Moreover, the ring is at least slightly open and has a minus clearance so as to be elastically deformed, so that when the shaft penetrates the hole, there is no gap between an inner periphery of the hole and the shaft. In addition, the washers made of a resin or the like are interposed between the rings, which are slightly compressed to apply an appropriate pressure when fitted in the shaft and tightened with a screw, and which also prevent wear due to temple folding operation.

DESCRIPTION OF THE PREFERRED EMBODIMENTS

Figure 1:
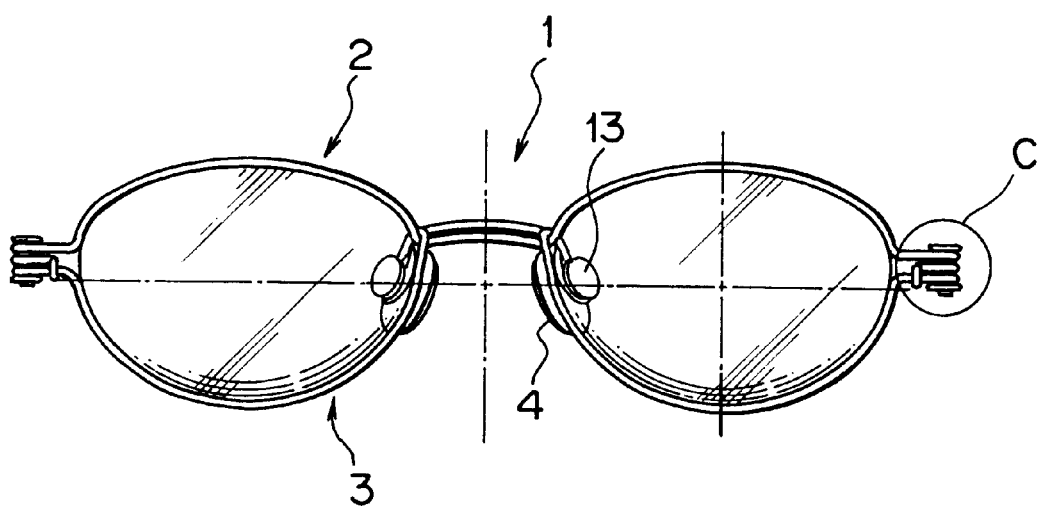
FIG. 1 is a front view of a front part of spectacles as an object of an embodiment of the present invention.
Figure 2:
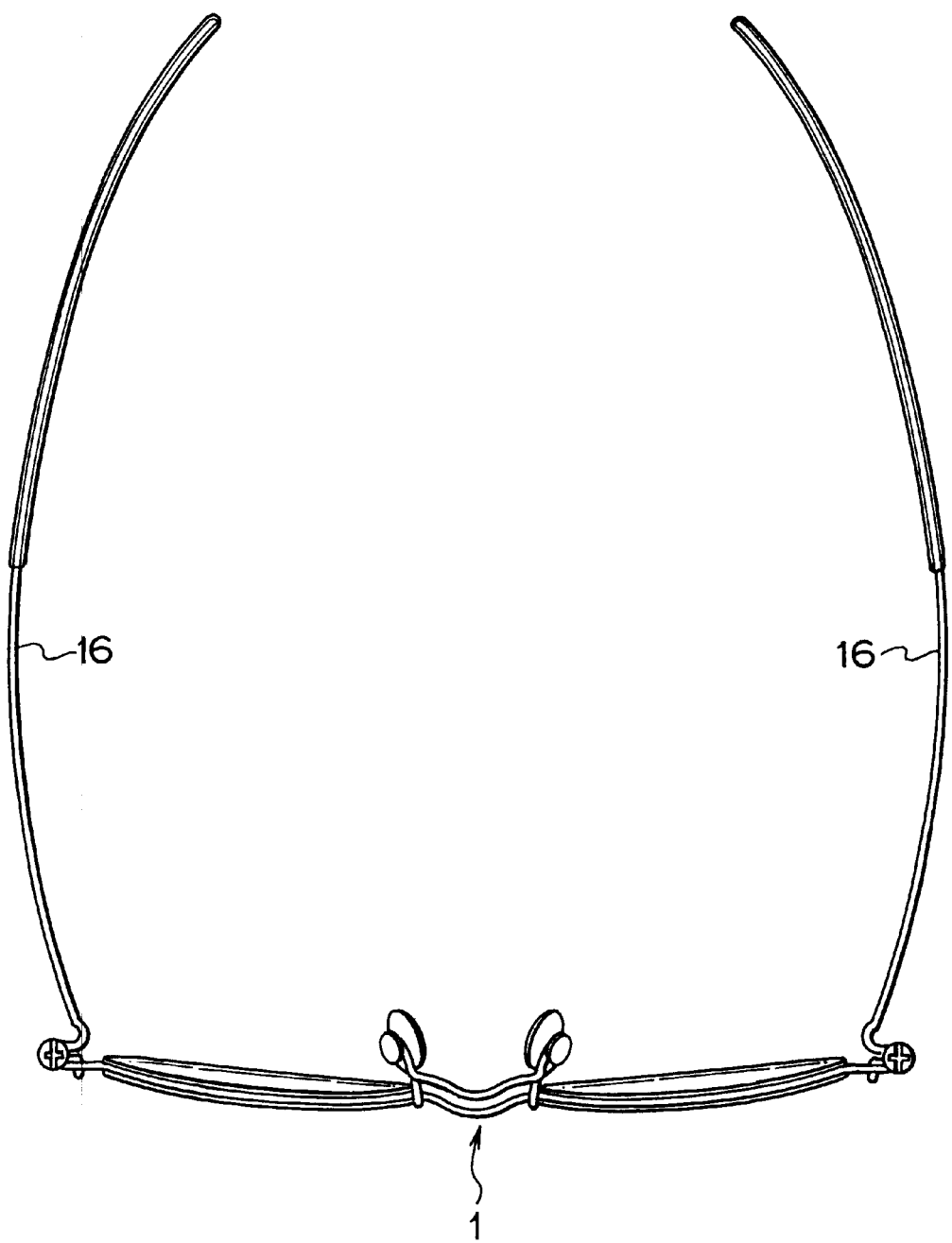
FIG. 2 is a plan view in the case in which temples are attached to the front part of the spectacles as an object of the embodiment of the present invention.

The embodiments of the present invention will be specifically described hereinbelow with reference to the drawings. The embodiments shown in the drawings are spectacles in which a new front part structure and a new temple joint structure are adopted.

A front part 1 is constructed by assembling an upper frame 2 and a lower frame 3. The upper frame 2 and the lower frame 3 are formed by bending a thin metallic wire material. When the upper frame 2 and the lower frame 3 are assembled, the front part 1 is constructed by simply retaining without using a fixing agent such as brazing. In addition, a nose pad 4 is attached in a manner such that an attaching part is fitted in legs formed at the lower frame 3.

Figure 3A:
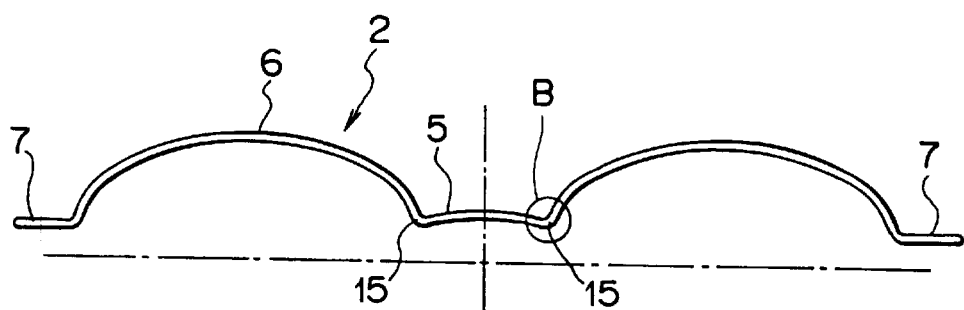
FIG. 3A is an exploded front view showing an upper frame of the front part of the embodiment of the present invention.
Figure 3B:
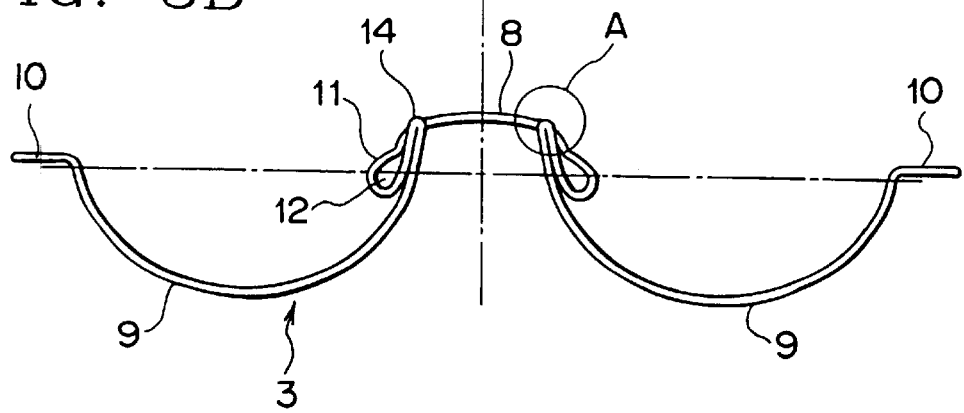
FIG. 3B is an exploded front view showing a lower frame of the front part of the embodiment of the present invention.

FIG. 3A shows the upper frame and FIG. 3B shows the lower frame, which are separately shown. In this way, the upper frame 2 and the lower frame 3 are individually formed, and then assembled to the front part 1.

The upper frame 2 has a connecting part 5 at the center thereof and upper rim pieces 6 and 6 are continuously formed on both sides of the connecting part 5. Furthermore, upper wraparound endpieces 7 and 7 are continuously formed on the outside of the upper rim pieces 6 and 6.

The lower frame 3 has a connecting part 8 at the center thereof, and lower rim pieces 9 and 9 are continuously formed on both sides of the connecting part 8. Furthermore, lower wraparound endpieces 10 and 10 are continuously formed on the outside of the lower rim pieces 9 and 9. Moreover, legs 11 and 11 are formed between the connecting part 8 and the lower rim pieces 9 and 9. In addition, an attaching part 13 of the nose pad 4 is fitted in a hole 12 of the leg 11.

Figure 4:
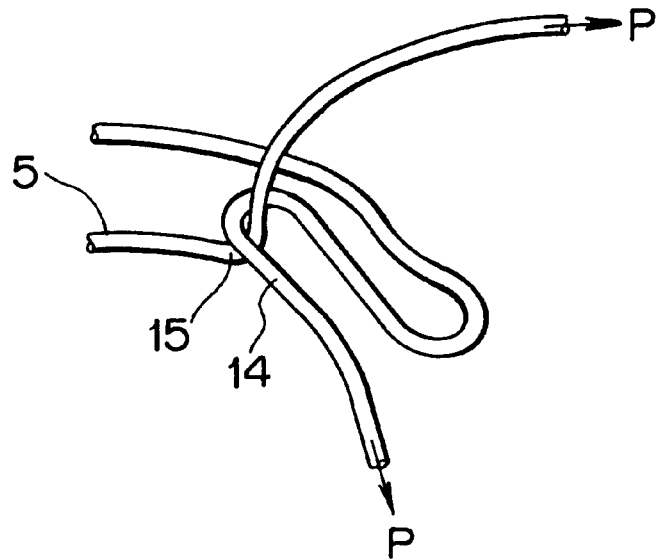
FIG. 4 is a perspective view showing a state in which a retaining part of the lower frame is retained to the boundary of the upper frame in the embodiment of the present invention.

The lower frame 3 is hooked to the upper frame 2 to be assembled. A part A of the lower frame 3 is retained to a part B of the upper frame 2. FIG. 4 is an enlarged view showing the retaining state thereof. An engaging part 14 formed at the boundary between an inner end of the lower rim piece 9 and the leg 11 is retained at a boundary 15 between the upper rim piece 6 and the connecting part 5 of the upper frame 2. Although there is a gap between the engaging part 14 and the boundary 15 that is engaged and sandwiched therebetween in the enlarged view in FIG. 4, there is actually no gap as in the drawing, and the upper frame 2 is sandwiched by the engaging part 14 so that no slippage occurs.

When the upper frame 2 and the lower frame 3 are assembled and lenses are fitted in the front part shown in FIG. 1, a tensile force P is applied to the upper rim piece 6 of the upper frame 2 and the lower rim piece 9 of the lower frame 3, and the engaging part 14 is stably positioned at the boundary 15. In this manner, the upper frame 2 and the lower frame 3 are retained to each other at the center by the boundary 15 and the engaging part 14.

Of course, the lenses are fitted in the rims formed by the upper and lower rim pieces 6 and 9 while the upper wraparound endpiece 7 and the lower wraparound endpiece 10 are separated in a state in which the engaging parts 14 and 14 of the lower frame 3 are retained to the boundary 15 and 15 of the upper frame 2, and after the lenses have been fitted, they are tightened with screws. In the embodiment shown in FIG. 1, rings each having a shaft hole are formed at the upper wraparound endpiece 7 and the lower wraparound endpiece 10, a ring formed at an end of the temple is fitted between the both rings, and a shaft penetrates the shaft hole and is tightened with the screw, thereby foldably attaching a temple 16.

Figure 5:
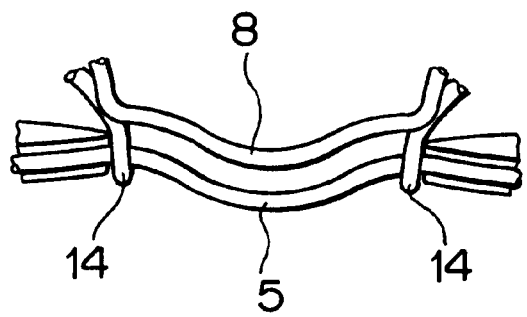
FIG. 5 is a plan view showing an enlarged connecting part in the embodiment of the present invention.

FIG. 5 shows the connecting part positioned at the center of the front part of this embodiment. In the connecting part, the connecting part 5 of the upper frame 2 and the connecting part 8 of the lower frame 3 are placed in parallel so that the strength of the central connecting part at the front part 1 is increased. When the temples 16 and 16 are pressed to open, the front part 1 is bent and thereby the largest moment is applied to the central connecting part. In this instance, placing both of the connecting parts 5 and 8 as shown in FIG. 5 enables the front part 1 to resist the moment, resulting in high strength of the front part 1.

Figure 6:
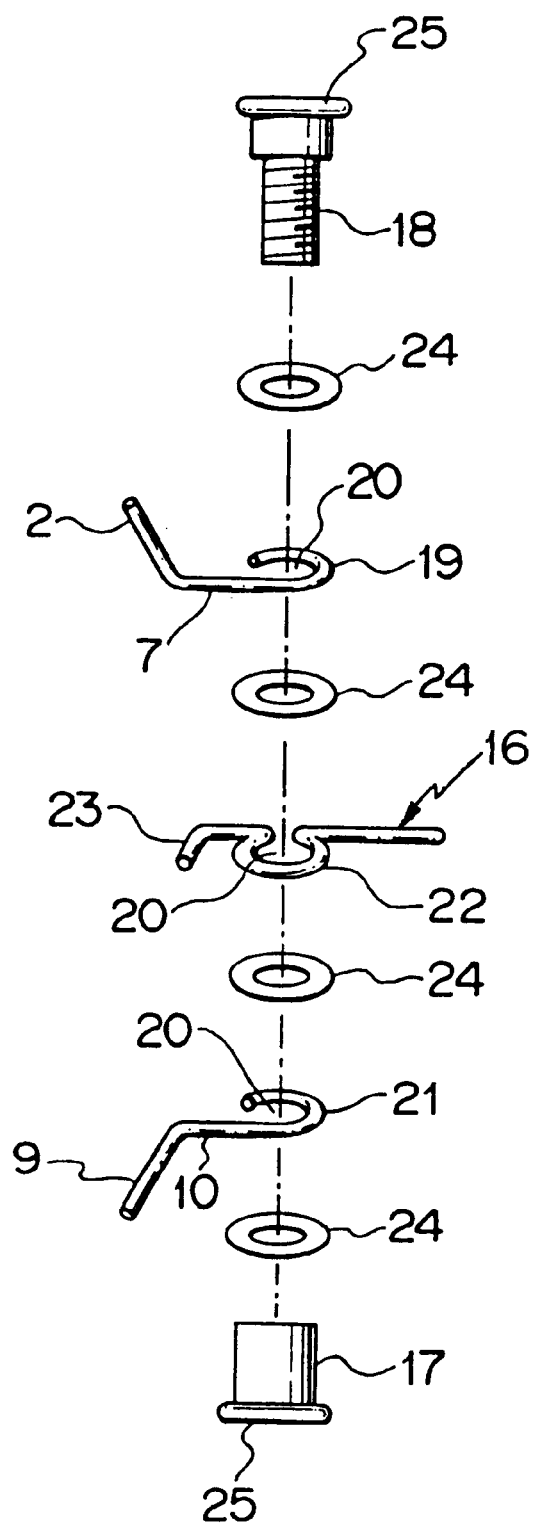
FIG. 6 is a development view showing a temple joint structure in the embodiment of the present invention.

FIG. 6 is a development view of a joint part C in FIG. 1. Reference numeral 17 denotes a shaft and 18 denotes a shaft screw. The temple 16 is foldably attached to the outside of the front part with the shaft 17 and the shaft screw 18. The upper frame 2 has a ring 19 having a shaft hole 20 formed at the upper wraparound endpiece 7 thereof, and also the lower frame 3 has a ring 21 having the shaft hole 20 formed at the lower wraparound endpiece 10 thereof. The temple has a ring 22 having the shaft hole 20 formed at an end thereof, and the ring has a stopper 23 formed at the end thereof in a bent state. Reference numerals 24, 24, . . . denote nylon washers.

The nylon washer 24, the ring 21 of the lower wraparound endpiece 10, the nylon washer 24, the ring 22 at the end of the temple, the nylon washer 24, the ring 19 of the upper wraparound endpiece 7, and the nylon washer 24 are fitted on the shaft 17 in order from the bottom, and the shaft screw 18 is tightened in order to prevent them from being disengaged from the shaft 17 and to appropriately press the nylon washers and rings so arranged without a gap.

The nylon washer 24, the ring 21 of the lower wraparound endpiece 10, the nylon washer 24, the ring 22 at the end of the temple, the nylon washer 24, the ring 19 of the upper wraparound endpiece 7, and the nylon washer 24 fitted on the shaft 17 are tightened with collars 25 and 25 of the shaft 17 and the shaft screw 18. In addition, the rings 19, 21, and 22 have the shaft holes 20, 20, and 20, in which the shaft 17 is fitted without a gap, for this reason, each of the shaft holes 20 has a slight minus clearance.

Figure 7A:
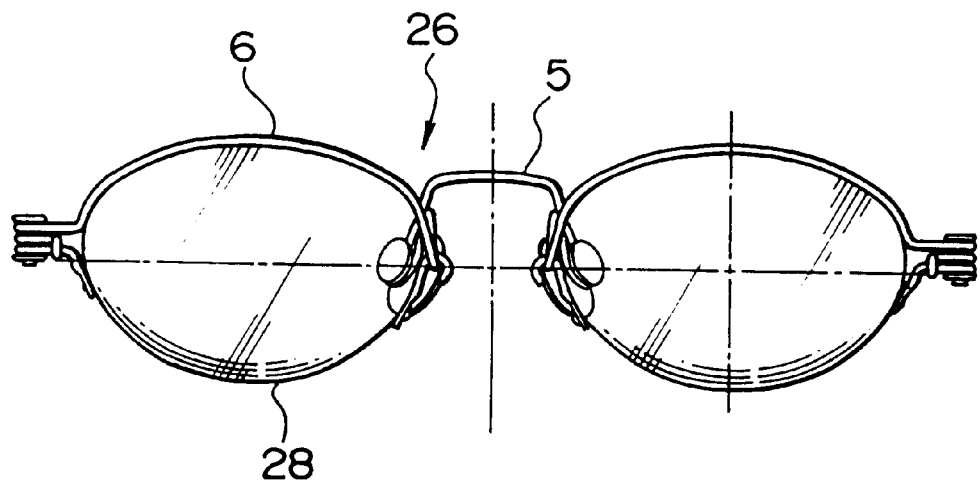
FIG. 7A is a front view showing the structure of the front part in another embodiment of the present invention and FIG. 7B is an exploded front view showing a partly enlarged front part in FIG. 7A.
Figure 7B:
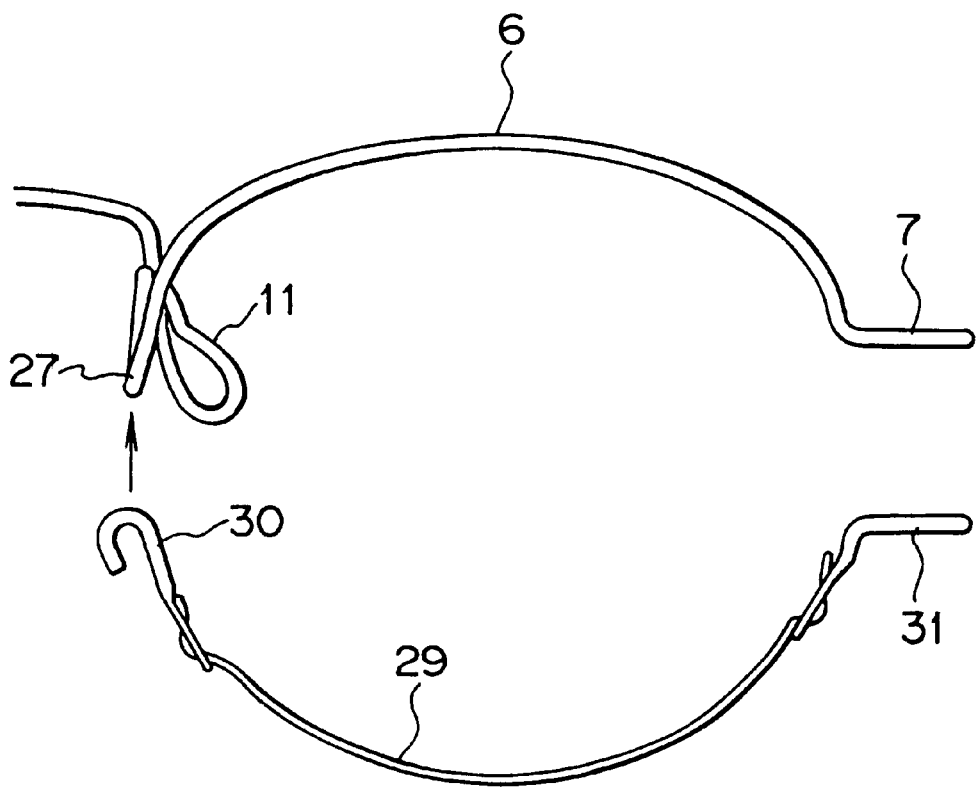

FIGS. 7A and 7B show another embodiment of the present invention, in which an upper frame 26 has the upper rim pieces 6 and 6 formed at both sides of the connecting part 5 similarly to the foregoing embodiment. The upper frame 26 has the leg 11 and a retaining part 27 continuously formed thereat. The lower frame is replaced by lower rim pieces 28 and 28, for which a high-tension filament 29 such as a metal filament is used as shown in FIG. 7B. One end of the high-tension filament 29 is connected to a hook 30, and another end is connected to a lower wraparound endpiece 31.

As shown in FIG. 7A, the hook 30 is retained by the retaining part 27, and the lower wraparound endpiece 31 is joined with the upper wraparound endpiece 7 using a screw while sandwiching an end of the temple. In this case, the temple joint structure is the same as that in the case described in FIG. 6, in which a ring of the lower wraparound endpiece 31 formed at the lower rim piece 28 is fitted in place of the ring 21 of the lower wraparound endpiece 10 formed at the lower frame 3.

Figure 8A:
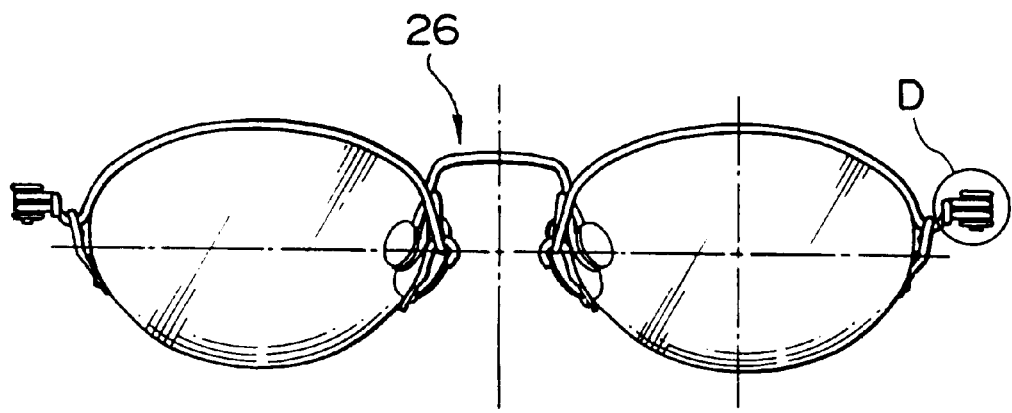
FIG. 8A is a front view showing the structure of a front part in another embodiment of the present invention and FIG. 8B is an exploded front view showing a partly enlarged front part in FIG. 8A.
Figure 8B:
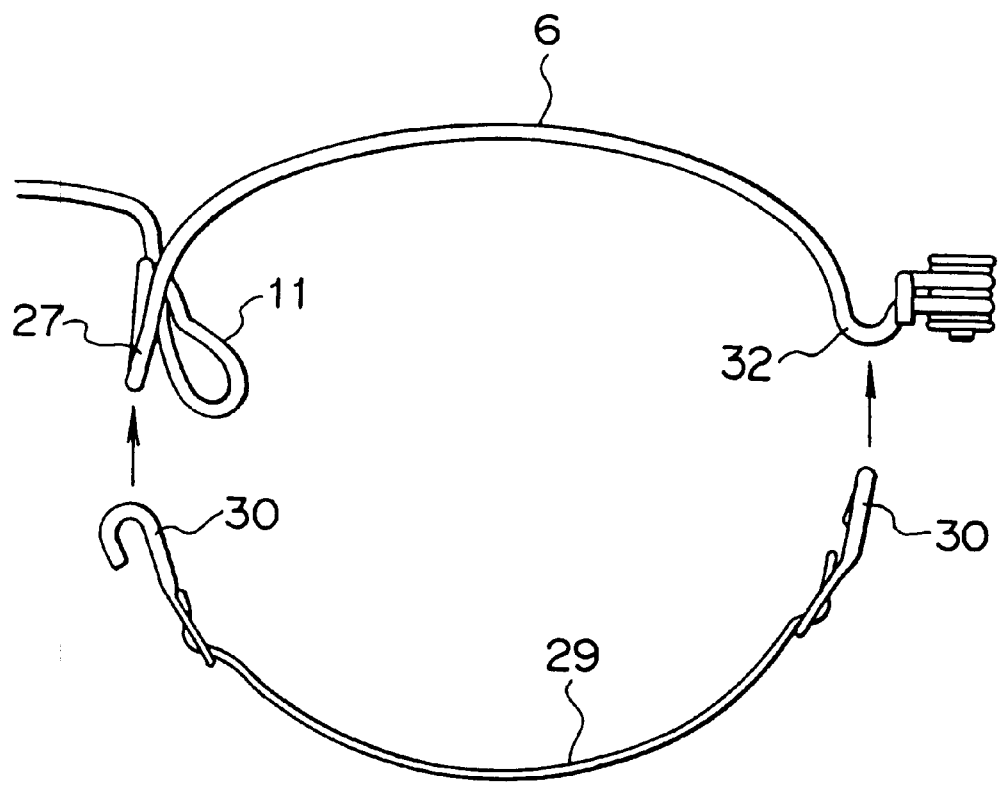

FIGS. 8A and 8B show another embodiment of the present invention, which is almost the same as that of the front part shown in FIG. 7A and 7B; however, the hook 30 is connected in place of the lower wraparound endpiece 31. A retaining part 32 that is to be retained to the hook 30 is formed on the outside of the upper rim piece 6. Here, a unit for retaining the high-tension filament 29 to the upper frame 26 is not limited to the hook 30 but includes any other attaching units.

Figure 9:
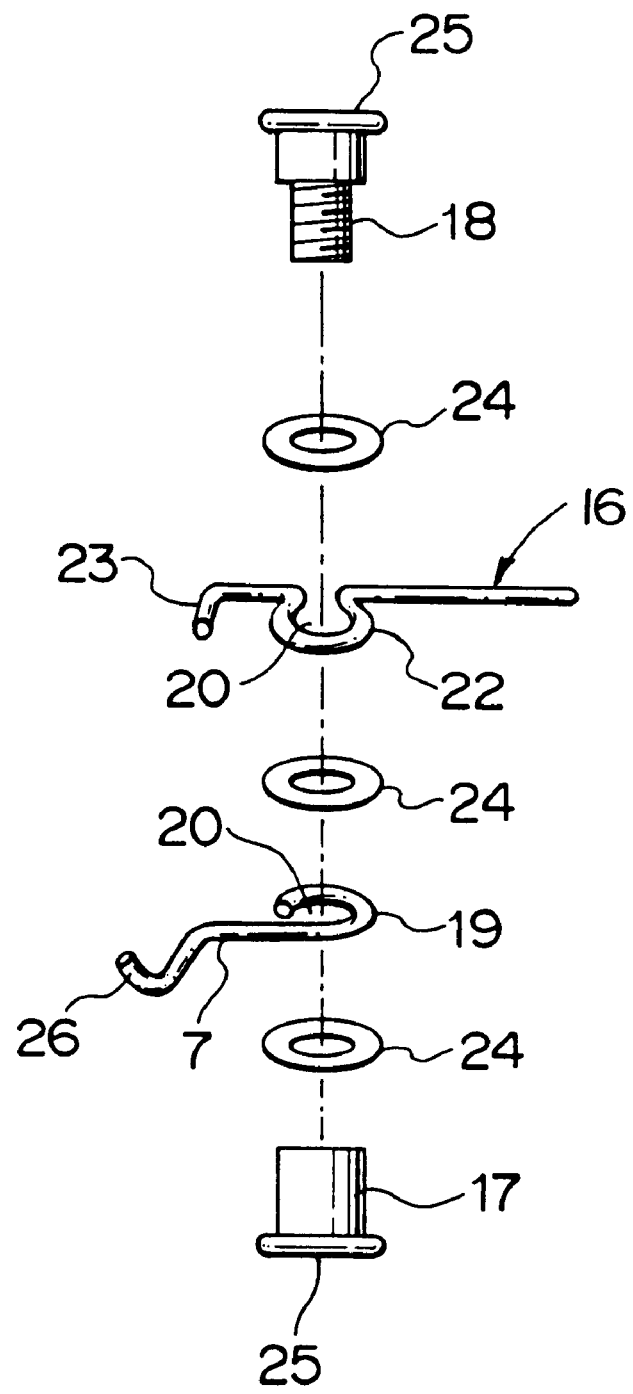
FIG. 9 is a development view of a temple joint structure of a part D in FIG. 8A.
Figure 10:
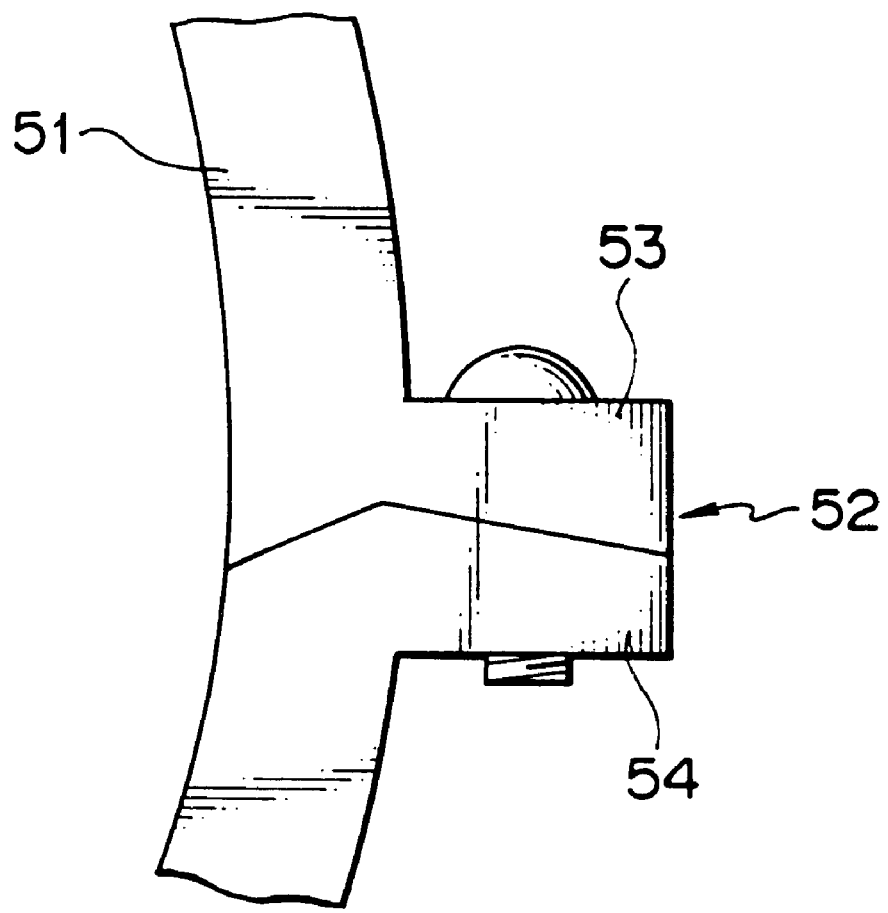
FIG. 10 is a front view showing a broach provided for a conventional rim.

FIG. 9 is a development view of the joint part D in FIG. 8. Reference numeral 17 denotes the shaft while reference numeral 18 denotes the shaft screw. The temple 16 is foldably attached to the outside of the front part with the shaft 17 and the shaft screw 18. The upper wraparound endpiece 7 of the upper frame 26 has the ring 19 having the shaft hole 20 formed thereat. The temple has the ring 22 having the shaft hole 20 formed at an end thereof and the ring has the stopper 23 formed at an end thereof in a bent state. Reference numerals 24, 24, . . . denote the nylon washers.

The nylon washer 24, the ring 19 of the upper wraparound endpiece 7, the nylon washer 24, the ring 22 at the end of the temple, and the nylon washer 24 are fitted on the shaft 17 in order from the bottom, and the shaft screw 18 is tightened in order to prevent them from being disengaged from the shaft 17 and to appropriately press the nylon washers and rings so arranged without a gap.

The nylon washer 24, the ring 19 of the upper wraparound endpiece 7, the nylon washer 24, the ring 22 at the end of the temple, and the nylon washer 24 fitted on the shaft 17 are tightened with the collars 25 and 25 of the shaft 17 and the shaft screw 18. In addition, the rings 19 and 22 have the shaft holes 20 and 20, in which the shaft 17 is fitted without a gap, for this reason, each of the shaft hole 20 has a slight minus clearance.

As described above, in the spectacles of the present invention, the front part is constructed by assembling the upper frame and the lower frame with each other, in which the upper frame is assembled with the lower rim pieces, and consequently, advantages that will be described hereinbelow can be provided. In addition, in the spectacles of the present invention, the temple joint structure has the ring formed at the wraparound endpiece with the wire material constructing the front part, and also has a ring at the end of the temple, in which the rings are assembled, the shaft is fitted in the shaft holes of the rings, and which is tightened with the screw, and consequently the advantages that will be described hereinbelow can be provided.

In the spectacles of the present invention, the front part is constructed by assembling the upper frame and the lower frame, which are formed by bending a thin wire material, and also, the leg to which the nose pad is to be attached is formed by bending the same wire material. Accordingly, there is no need for a broach or brazing of the leg for attaching the nose pad as in the conventional spectacles, and as a result, the front part can easily be manufactured, and parts will not drop out because there is no brazing part.

In addition, when the lower rim pieces are assembled without using the lower frame, since there is no brazing part as well, manufacturing is easy and no dropping out of the parts occurs, resulting in a low manufacturing cost. Furthermore, the shape of the front part in which the upper frame and the lower frame are formed by bending the thin wire material or the lower rim pieces are assembled is made slimmer, so that favorable spectacles in terms of design can be provided.

The spectacles of the present invention is constructed by forming the front part by bending the thin wire material, in which each of the wraparound endpieces on the outside of the front part has the ring formed by bending, and in which the ring so formed and the ring formed by bending the end of the temple are assembled to be joined with a screw. The shaft hole of the ring has a minus clearance so as to have no gap between the shaft, and fitting the shaft in the shaft hole slightly increases elasticity, thereby preventing loosening of the temple. Of course, there is no need for brazing, and also there is no possibility of disengaging of the temple. Also, a joint member such as a hinge is not used, and the rings formed by bending the same wire material as that of the frame are connected together with the shaft, and accordingly, the appearance of the slim spectacles frame constructed by the wire material is not spoiled.

What is claimed is:

1. An eyeglass frame comprising:

a front part for holding lenses;

temples foldably attached to both outsides of the front part;

said front part includes an upperframe made of a first wire, said front part having upper rim pieces on both sides of a first connecting part, and a lower frame made of a second wire, said lower frame having lower rim pieces on both sides of a second connecting part, wherein the connecting parts of the upper and lower frames are retained to each other so as to assemble the upper and lower frames; and wherein legs to which nose pads are to be attached are continuously formed between the lower rim pieces and the connecting part of the upper frame or the lower frame.

2. An eyeglass frame comprising:

a front part for holding lenses;

temples foldably attached to both outsides of the front part;

said front part includes an upper frame made of a first wire, said front part having upper rim pieces on both sides of a connecting part, and two lower rim pieces attached to the upper rim pieces, forming a pair, having the connecting part connected to the upper rim pieces on both sides of a high tension filament, wherein inner connecting part of the lower rim pieces are respectively retained to retaining parts formed between the upper rim pieces and the connecting part of the upper frame, wherein outer connecting part of the lower rim pieces are respectively connected to outer end of the upper rim pieces so as to assemble the upper frame and the lower rim pieces, and wherein legs to which nose pads are to be attached are continuously formed between the upper rim pieces and the connecting part of the upper frame.

3. An eyeglass frame comprising:

a front part for holding lenses;

temples foldably attached to both outsides of the front part;

said front part includes an upper frame having upper rim pieces on both sides of a connecting part, and lower rim pieces attached to the upper rim pieces, forming a pair, wherein inner ends of the lower rim pieces are respectively retained to retaining parts formed between the upper rim pieces and the connecting part of the upper frame, wherein wraparound endpieces provided on the outside of the upper and lower rim pieces are connected to each other so as to assemble the upper frame and the lower rim pieces;

and wherein legs to which nose pads are to be attached are continuously formed between the upper rim pieces and the connecting part of the upper frame; and said temples joint structure has rings at the upper wraparound endpieces on the outside of the front part, the rings being formed by bending the upper frame, and which has also rings formed by bending ends of the temples, wherein the rings are assembled, a shaft is fitted in shaft holes without loosening, and which is tightened with a screw.

4. An eyeglass frame comprising:

a front part for holding lenses;

temples foldably attached to both outsides of the front part;

said front part includes an upper frame having upper rim pieces on both sides of a connecting part, and lower rim pieces attached to the upper rim pieces, forming a pair, wherein inner ends of the lower rim pieces are respectively retained to retaining parts formed between the upper rim pieces and the connecting part of the upper frame, wherein the outer ends of the lower rim pieces are retained to retaining parts formed between the upper rim pieces and the wraparound endpieces of the upper frame so as to assemble the upper frame and the lower rim pieces, and wherein legs to which nose pads are to be attached are continuously formed between the upper rim pieces and the connecting part of the upper frame; and said temple joint structure has rings at the upper wraparound endpieces and the lower wraparound endpieces on the outside of the front part, the rings being formed by bending the upper frame and the lower rim pieces, and which has also rings formed by bending ends of the temples, wherein the rings are assembled, a shaft is fitted in shaft holes without loosening, and which is tightened with a screw.

5. An eyeglass frame comprising:

a front part for holding lenses;

temples foldably attached to both outsides of the front part;

said front part includes an upper frame having upper rim pieces on both sides of a connecting part, and lower rim pieces attached to the upper rim pieces, forming a pair, wherein inner ends of the lower rim pieces are respectively retained to retaining parts formed between the upper rim pieces and the connecting part of the upper frame, wherein the outer ends of the lower rim pieces are retained to retaining parts formed between the upper rim pieces and wraparound endpieces of the upper frame so as to assemble the upper frame and the lower rim pieces, and wherein legs to which nose pads are to be attached are continuously formed between the upper rim pieces and the connecting part of the upper frame; and said temple joint structure has rings at the upper wraparound endpieces on the outside of the front part, the rings being formed by bending the upper frame, and which has also rings formed by bending ends of the temples, wherein the rings are assembled, a shaft is fitted in shaft holes without loosening, and which is tightened with a screw.

6. The eyeglass frame according to claim 2 or 4, wherein said lower rim piece has a hook connected to an inner end of a high-tension filament, and which has the lower wraparound endpiece connected to the outer end thereof.

7. The eyeglass frame according to claim 3 or 5, wherein said lower rim piece has hooks connected to both ends of a high-tension filament.

8. The eyeglass frame according to claims 1, 2, 3, 4, or 5, wherein in said temple joint structure, the shaft hole of the ring has a minus clearance in order to slightly increase the size thereof when the shaft is fitted.

9. The eyeglass frame according to claims 1, 2, 3, 4, or 5, wherein in said temple joint structure, washers elastically deformed by tightening are fitted between the rings assembled together.

* * * * *